(12) United States Patent
Jamison

(10) Patent No.: US 9,845,692 B2
(45) Date of Patent: Dec. 19, 2017

(54) TURBINE COMPONENT CONNECTION WITH THERMALLY STRESS-FREE FASTENER

(71) Applicant: General Electric Company, Schenectady, NY (US)

(72) Inventor: Joshua Brian Jamison, Liberty Township, OH (US)

(73) Assignee: General Electric Company, Schenectady, NY (US)

(*) Notice: Subject to any disclaimer, the term of this patent is extended or adjusted under 35 U.S.C. 154(b) by 272 days.

(21) Appl. No.: 14/704,406

(22) Filed: May 5, 2015

(65) Prior Publication Data
US 2016/0326896 A1 Nov. 10, 2016

(51) Int. Cl.
*F01D 9/04* (2006.01)
*F01D 25/00* (2006.01)
*F01D 5/28* (2006.01)

(52) U.S. Cl.
CPC .............. *F01D 9/042* (2013.01); *F01D 5/284* (2013.01); *F01D 9/041* (2013.01); *F01D 25/005* (2013.01); *F05D 2220/32* (2013.01); *F05D 2230/642* (2013.01); *F05D 2240/128* (2013.01); *F05D 2250/42* (2013.01); *F05D 2250/711* (2013.01); *F05D 2260/36* (2013.01);
(Continued)

(58) Field of Classification Search
CPC .......... F01D 5/284; F01D 9/041; F01D 9/042; F01D 25/005; F05D 2260/36; F05D 2300/50212; F05D 2300/6033; F05D 2230/642; F05D 2250/711; F05D 2240/128; F05D 2220/32; F05D 2300/17; F05D 2250/42
See application file for complete search history.

(56) References Cited

U.S. PATENT DOCUMENTS 3,064,962 A 11/1962 Boron
3,318,622 A 5/1967 Crumpler
(Continued)

FOREIGN PATENT DOCUMENTS

CN 104100303 A 10/2014
EP 0636064 A1 2/1995
(Continued)

OTHER PUBLICATIONS

European Search Report and Written Opinion issued in connection with corresponding EP Application No. 16168187.9 dated Sep. 27, 2016.
(Continued)

*Primary Examiner* — Igor Kershteyn
(74) *Attorney, Agent, or Firm* — General Electric Company; William Scott Andes

(57) ABSTRACT

A turbine component assembly for a gas turbine engine includes: a first component having a first coefficient of thermal expansion and including an end face; a second component including a mating surface abutting the end face; and a fastener having a second coefficient of thermal expansion different from the first coefficient of thermal expansion, the fastener including a shank engaging the second component and an enlarged head engaging a mounting slot in the first component; wherein the mating surface and the end face shaped to permit relative pivoting movement between the first and second components.

26 Claims, 4 Drawing Sheets

(52) U.S. Cl.
CPC ............. *F05D 2300/17* (2013.01); *F05D 2300/50212* (2013.01); *F05D 2300/6033* (2013.01); *Y02T 50/672* (2013.01); *Y02T 50/673* (2013.01)

(56) References Cited

U.S. PATENT DOCUMENTS

| | | | |
|---|---|---|---|
| 3,560,132 | A | 2/1971 | Gulistan |
| 3,601,383 | A | 8/1971 | Mahringer |
| 3,619,077 | A | 11/1971 | Wile et al. |
| 4,076,451 | A | 2/1978 | Jankot |
| 4,416,440 | A | 11/1983 | Bowman |
| 4,585,366 | A | 4/1986 | Uchida |
| 4,747,739 | A | 5/1988 | Bowman |
| 4,834,569 | A | 5/1989 | Foote et al. |
| 4,850,732 | A | 7/1989 | Swanson |
| 4,934,857 | A | 6/1990 | Swanson |
| 5,022,805 | A | 6/1991 | Roberts |
| 5,098,765 | A | 3/1992 | Bien |
| 5,278,243 | A | 1/1994 | Soane |
| 5,358,284 | A | 10/1994 | Broyles |
| 5,451,116 | A | 9/1995 | Czachor et al. |
| 5,497,616 | A | 3/1996 | Roberts |
| 6,000,906 | A * | 12/1999 | Draskovich .......... F01D 5/3084 415/189 |
| 6,045,310 | A | 4/2000 | Miller et al. |
| 6,056,447 | A | 5/2000 | Caras |
| 6,164,903 | A * | 12/2000 | Kouris ................. F01D 9/04 415/135 |
| 6,200,092 | B1 * | 3/2001 | Koschier .............. F01D 5/146 415/191 |
| 6,543,996 | B2 * | 4/2003 | Koschier .............. F01D 5/186 415/200 |
| 6,733,235 | B2 * | 5/2004 | Alford ................. F01D 11/08 415/173.1 |
| 7,048,463 | B2 | 5/2006 | Babej |
| 7,114,917 | B2 * | 10/2006 | Legg .................. F01D 9/04 415/137 |
| 7,153,054 | B2 | 12/2006 | Arbona |
| 7,247,002 | B2 * | 7/2007 | Albrecht .............. F01D 5/147 415/200 |
| 7,452,182 | B2 * | 11/2008 | Vance ................. F01D 5/14 415/135 |
| 7,536,897 | B2 | 5/2009 | Hansen |
| 7,988,395 | B2 | 8/2011 | Steffier |
| 8,556,531 | B1 | 10/2013 | Bird et al. |
| 2002/0127097 | A1 | 9/2002 | Darolia et al. |
| 2004/0033105 | A1 | 2/2004 | North |
| 2006/0193744 | A1 | 8/2006 | Yang |
| 2006/0228211 | A1 | 10/2006 | Vance et al. |
| 2008/0115557 | A1 | 5/2008 | Hansen |
| 2010/0189529 | A1 | 7/2010 | Steffier |
| 2013/0216361 | A1 | 8/2013 | Propheter-Hinckley |
| 2014/0212284 | A1 | 7/2014 | Jamison et al. |
| 2014/0308116 | A1 | 10/2014 | Witz et al. |

FOREIGN PATENT DOCUMENTS

| | | |
|---|---|---|
| JP | H04-232306 A | 8/1992 |
| JP | 2002-295202 A | 10/2002 |
| JP | 2004-011434 A | 1/2004 |
| JP | 2007-298165 A | 11/2007 |
| WO | 9321010 A1 | 10/1993 |

OTHER PUBLICATIONS

Blosser, Max L. and McWithey, Robert R. "Theoretical Basis for Design of Thermal-Stress-Free Fasteners", NASA Technical Paper 2226, Dec. 1983, Washington D.C.

Unofficial English Translation of Chinese Office Action issued in connection with corresponding CN Application No. 201610291433.6 dated Mar. 20, 2017.

First Office Action and Search issued in connection with corresponding CN Application No. 201610291433.6 dated Mar. 20, 2017.

Search Report issued in connection with corresponding JP Application No. 2016-085646 dated Apr. 26, 2017.

Notification for Reason for Refusal issued in connection with corresponding JP Application No. 2016-085646 dated May 9, 2017.

* cited by examiner

TURBINE COMPONENT CONNECTION WITH THERMALLY STRESS-FREE FASTENER

STATEMENT REGARDING FEDERALLY SPONSORED RESEARCH & DEVELOPMENT

The U.S. Government may have certain rights in this invention pursuant to contract number W911W6-11-2-0009 awarded by the Department of Defense.

BACKGROUND OF THE INVENTION

The technology described herein relates generally to gas turbine engines, and more particularly to mechanical connections in such engines incorporating a low-ductility material.

A typical gas turbine engine includes a turbomachinery core having a high pressure compressor, a combustor, and a high pressure turbine in serial flow relationship. The core is operable in a known manner to generate a primary gas flow. The high pressure turbine (also referred to as a gas generator turbine) includes one or more stages which extract energy from the primary gas flow. Each stage comprises a stationary turbine nozzle followed by a downstream rotor carrying turbine blades. These components operate in an extremely high temperature environment, and must be cooled by air flow to ensure adequate service life. Typically, the air used for cooling is extracted (bled) from the compressor. Bleed air usage negatively impacts specific fuel consumption ("SFC") and should generally be minimized.

Metallic turbine structures can be replaced with materials having better high-temperature capabilities, such as ceramic matrix composites ("CMCs"). The density of CMCs is approximately one-third of that of conventional metallic superalloys used in the hot section of turbine engines, so by replacing the metallic alloy with CMC while maintaining the same airfoil geometry, the weight of the component decreases. By replacing a majority of the airfoils in a turbine nozzle, the total weight of the assembly decreases, as well as the need for cooling air flow.

CMC and similar materials have unique mechanical properties that must be considered during design and application of an article such as a shroud segment. For example, CMC materials have relatively low tensile ductility or low strain to failure when compared with metallic materials. Also, CMCs have a coefficient of thermal expansion ("CTE") approximately one-third that of superalloys, which means that a rigid joint between the two different materials induces large strains and stresses with a change in temperature from the assembled condition. The allowable stress limits for CMCs are also lower than metal alloys which drives a need for simple and low stress design for CMC components.

Concurrently, components having flow-directing shapes (such as airfoils) should not be allowed to float independently of each other, which would negatively impact aerodynamic performance.

Accordingly, there is a need for an apparatus for mounting CMC and other low-ductility airfoils that minimizes mechanical loads on those components while providing a statically determinant anchor point.

BRIEF DESCRIPTION OF THE INVENTION

This need is addressed by the technology described herein, which provides a turbine component assembly including components which are positioned and retained to a surrounding structure while permitting limited freedom of movement.

According to one aspect of the technology described herein, a turbine component assembly for a gas turbine engine includes: a first component having a first coefficient of thermal expansion and including an end face; a second component including a mating surface abutting the end face; and a fastener having a second coefficient of thermal expansion different from the first coefficient of thermal expansion, the fastener including a shank engaging the second component and an enlarged head engaging a mounting slot in the first component; wherein the mating surface and the end face shaped to permit relative pivoting movement between the first and second components.

According to one aspect of the technology described herein, a turbine nozzle apparatus for a gas turbine engine includes: an annular inner band; an annular outer band circumscribing the inner band; a plurality of airfoil-shaped structural vanes extending between and interconnecting the inner band and the outer band; and a plurality of airfoil-shaped non-structural vanes extending between the inner band and the outer band, each non-structural vane having a root end received by the inner band and a tip end received by the outer band, wherein the one of the tip end and the root end is connected to the respective band by a fastener having a shank engaging the band and an enlarged head engaging a mounting slot in the non-structural vane.

BRIEF DESCRIPTION OF THE DRAWINGS

The invention may be best understood by reference to the following description taken in conjunction with the accompanying drawing figures in which.

DETAILED DESCRIPTION OF THE INVENTION

Figure 1:
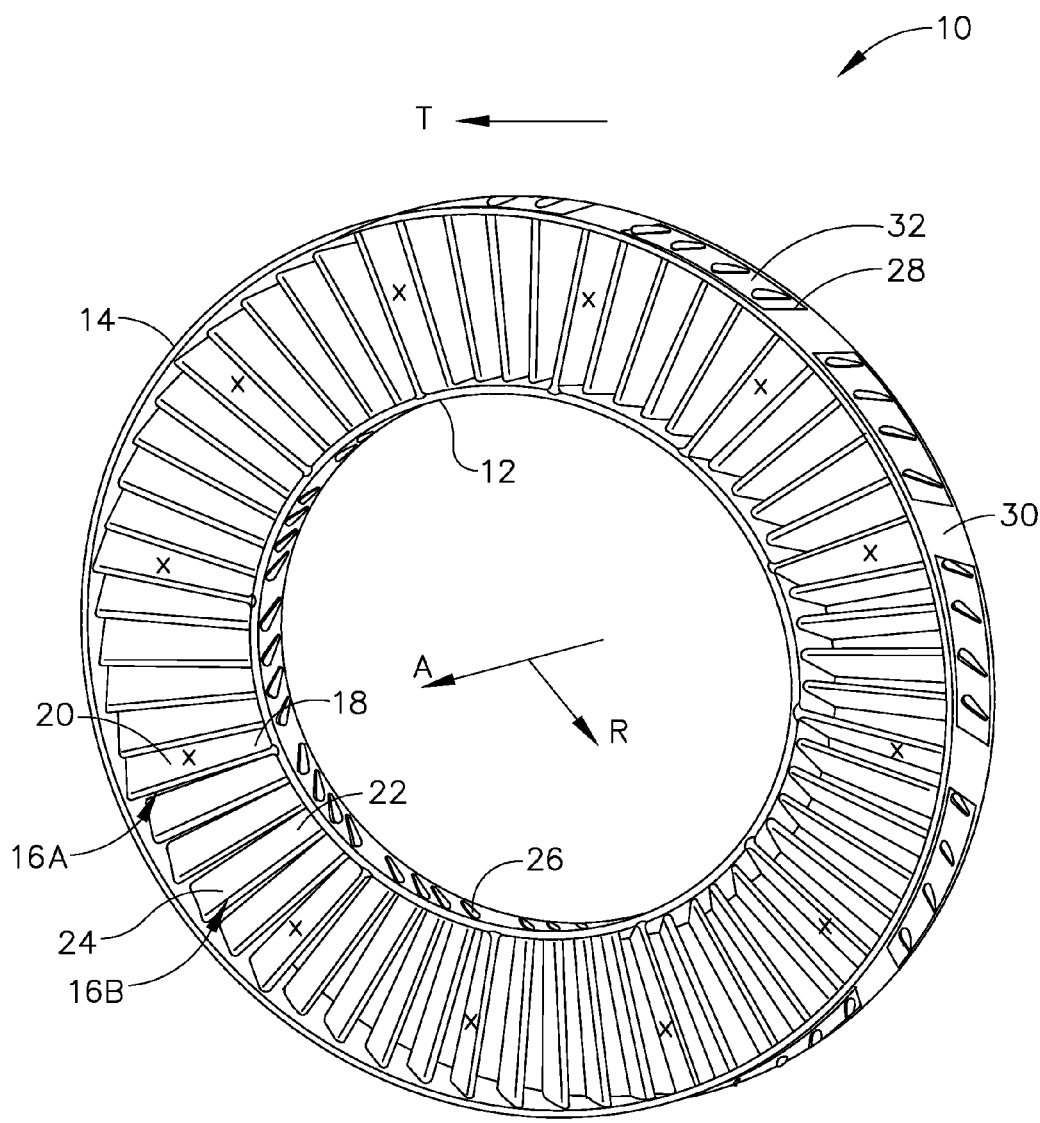
FIG. 1 is a schematic perspective view of a turbine nozzle assembly for a gas turbine engine, constructed according to an aspect of the technology described herein.
Figure 2:
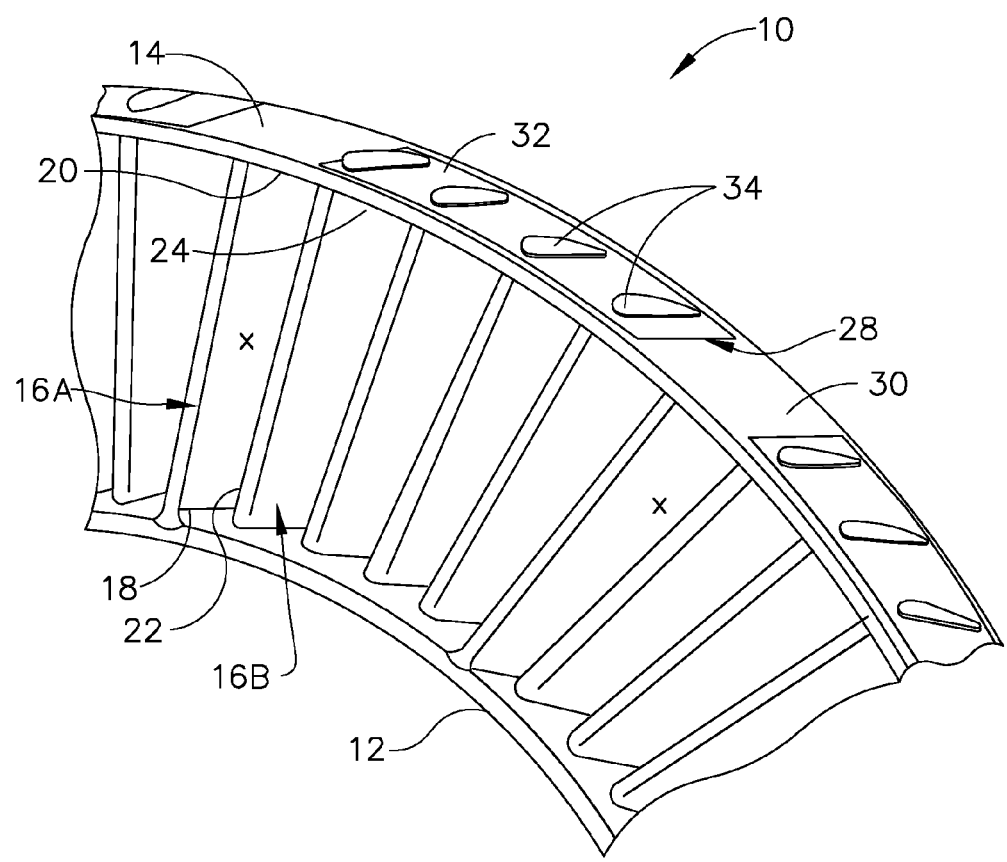
FIG. 2 is an enlarged view of a portion of the turbine nozzle shown in FIG. 1.

Referring to the drawings wherein identical reference numerals denote the same elements throughout the various views, FIGS. 1 and 2 depict an exemplary turbine nozzle 10 constructed according to an aspect of the technology described herein. The turbine nozzle 10 is a stationary component forming part of a turbine section of a gas turbine engine. It will be understood that the turbine nozzle 10 would be mounted in a gas turbine engine upstream of a turbine rotor with a rotor disk carrying an array of airfoil-shaped turbine blades, the nozzle and the rotor defining one stage of the turbine. The primary function of the nozzle is to direct the combustion gas flow into the downstream turbine rotor stage.

A turbine is a known component of a gas turbine engine of a known type, and functions to extract energy from high-temperature, pressurized combustion gases from an upstream combustor (not shown) and to convert the energy to mechanical work, which is then used to drive a compressor, fan, shaft, or other mechanical load (not shown). The principles described herein are equally applicable to turbofan, turbojet and turboshaft engines, as well as turbine engines used for other vehicles or in stationary applications.

It is noted that, as used herein, the term "axial" or "longitudinal" refers to a direction parallel to an axis of rotation of a gas turbine engine, while "radial" refers to a direction perpendicular to the axial direction, and "tangential" or "circumferential" refers to a direction mutually perpendicular to the axial and tangential directions. (See arrows "A", "R", and "T" in FIG. 1). These directional terms are used merely for convenience in description and do not require a particular orientation of the structures described thereby.

The turbine nozzle 10 includes an annular inner band 12 and an annular outer band 14, which define the inner and outer boundaries, respectively, of a hot gas flowpath through the turbine nozzle 10.

An array of airfoil-shaped turbine vanes is disposed between the inner band 12 and the outer band 14. The array of vanes includes a group of structural vanes 16A alternating with a group of non-structural vanes 16B. The turbine nozzle 10 may be considered a "hybrid" structure in that the structural and non-structural vanes 16A and 16B are made from materials with different properties.

Each structural vane 16A has opposed concave and convex sides extending between a leading edge and a trailing edge, and extends between a root end 18 and a tip end 20. A sufficient number of structural vanes 16A are provided so as to maintain a concentric relationship between the inner band 12 and the outer band 14 during engine operation and to control the relative thermal growth between the inner band 12 and the outer band 14. As used herein, the term "structural" identifies vanes 16A which are configured and mounted so as to transfer thermal and/or mechanical loads between the inner band 12 and the outer band 14. The structural vanes 16A are functionally integral with the inner and outer bands 12 and 14, and may be part of a single cast or forged component, or may be welded, brazed, or mechanically fastened to the inner and outer bands 12 and 14. In the specific example illustrated, there are 12 structural vanes 16A equally spaced around the circumference of the turbine nozzle 10, each denoted with an "x" in FIGS. 1 and 2.

The structural vanes 16A are constructed from a strong, ductile material such as a metal alloy. For example, a known type of nickel-, iron-, or cobalt-based "superalloy" may be used for this purpose.

Each non-structural vane 16B has opposed concave and convex sides extending between a leading edge and a trailing edge, and extends between a root end 22 and a tip end 24. The root end 22 terminates at a root end face 200 (see FIG. 3). One or more non-structural vanes 16B are disposed circumferentially between each pair of structural vanes 16A. In the specific example illustrated, there are 48 non-structural vanes 16B equally spaced around the circumference of the turbine nozzle 10, and the non-structural vanes 16B are disposed in groups of four. A single structural vane 16A separates adjacent groups of non-structural vanes 16B.

As used herein, the term "non-structural" identifies vanes 16B which are configured and mounted such that they do not transfer significant thermal and/or mechanical loads between the inner band 12 and the outer band 14. It will be understood that all vanes 16A and 16B are individually subject to significant aerodynamic (e.g. gas pressure) loads, and must have sufficient stiffness and yield strength to withstand these loads in operation.

Each of the non-structural vanes 16B may be constructed from a low-ductility, high-temperature-capable material. One example of a suitable material for the non-structural vanes 16B is a ceramic matrix composite (CMC) material of a known type. Generally, commercially available CMC materials include a ceramic type fiber for example SiC, forms of which are coated with a compliant material such as Boron Nitride (BN). The fibers are carried in a ceramic type matrix, one form of which is Silicon Carbide (SiC). Typically, CMC type materials have a room temperature tensile ductility of no greater than about 1%, herein used to define and mean a low tensile ductility material. Generally CMC type materials have a room temperature tensile ductility in the range of about 0.4 to about 0.7%. This is compared with metals typically having a room temperature tensile ductility of at least about 5%, for example in the range of about 5 to about 15%.

Figure 3:
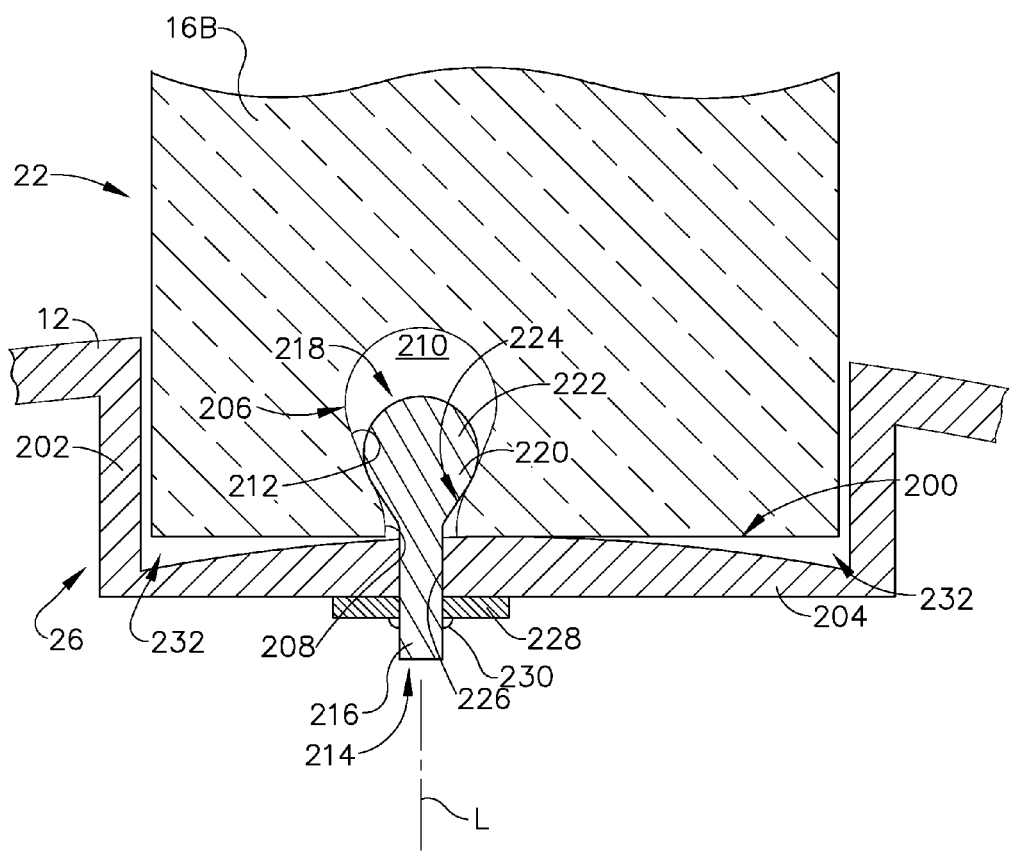
FIG. 3 is a cross-sectional view of a portion of the turbine nozzle shown in FIG. 1.

As shown in FIG. 3, the inner band 12 incorporates an array of airfoil-shaped blind root pockets 26 formed therein. Each root pocket 26 receives the root end 22 of one of the non-structural vanes 16B. Each root pocket 26 is defined by a perimeter wall 202 and a floor 204. A portion of the root end 22 of the non-structural vane 16B is surrounded by the perimeter wall 202. The perimeter wall 202 is sized and shaped so that each permits a small gap between the root pocket 26 and the associated non-structural vane 16B.

The root end 22 of each non-structural vane 16B includes a mounting slot 206 which extends transversely therethrough. The cross-sectional shape of the mounting slot 206 comprises an entrance 208 adjacent the root end face 200, an enlarged end chamber 210, and a tapered section 212 interconnecting the entrance 208 and the end chamber 210. The tapered section 212 comprises a pair of spaced-apart walls which diverge from each other.

The root end 22 of each non-structural vane 16B is retained to the root pocket 26 using a fastener 214 engaged with the mounting slot 206 and the floor 204 of the root pocket 26.

The fastener 214 includes a shank 216 and an enlarged head 218. The head 218 includes a proximate portion 220 adjacent the shank 216 and a distal portion 222. The proximate portion 220 has a surface 224 which is a body of revolution about a longitudinal axis "L" of the shank 216. The surface 224 has a diverging shape, that is, its diameter increases as the distance away from an intersection of the shank and the proximate portion increases. The specific shape may be altered to suit a particular application; for example the surface may be conical or convex-curved. The fastener 214 may be constructed from a strong, ductile material such as a metal alloy. For example, a known type of nickel-, iron-, or cobalt-based "superalloy" may be used for this purpose.

The proximate portion 220 bears against the tapered section 212 of the mounting slot 206, defining a line or ring contact. The shank 216 extends through a mounting hole 226 in the floor 204 of the root pocket 26. The shank 216 is retained in place by a suitable retainer. In the illustrated example, a washer 228 is placed over the shank 216, bearing against the floor 204 and secured by a metallurgical bond such as a weld 230. Nonlimiting examples of other suitable retainers include a crimped collar or a conventional threaded nut.

Figure 4:
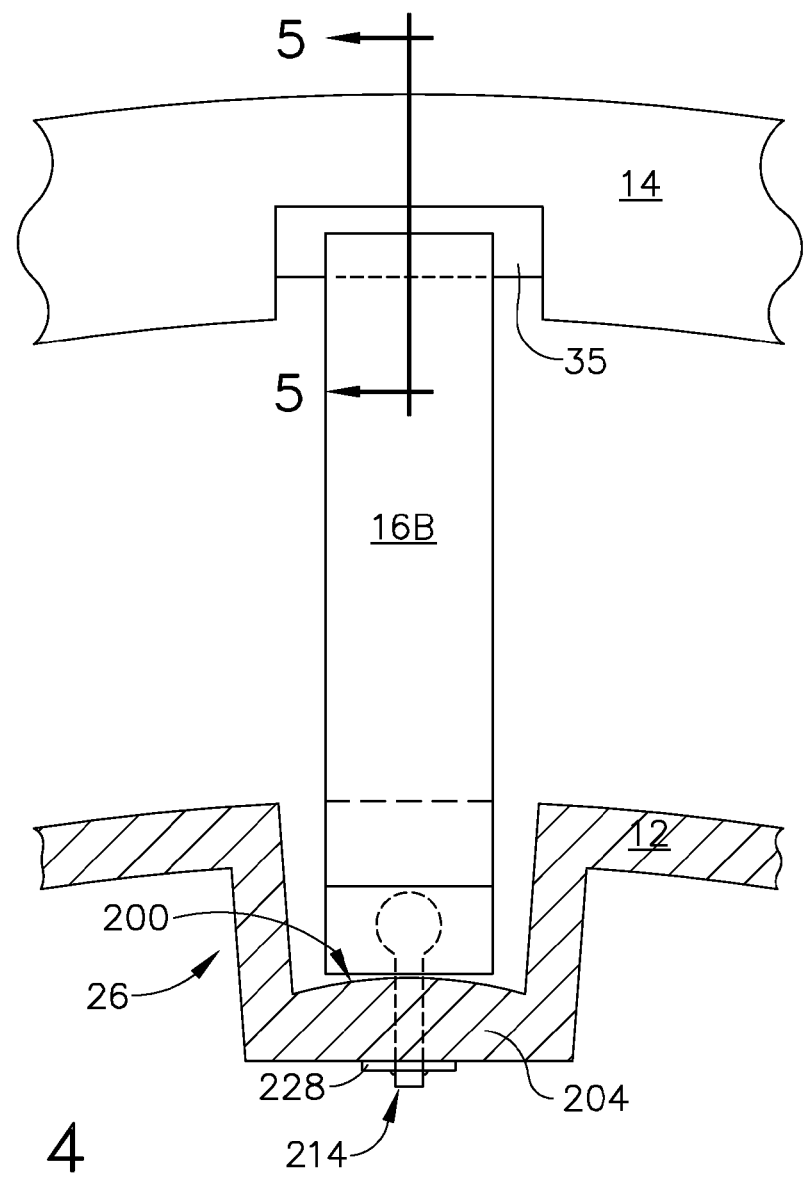
FIG. 4 is a cross-sectional view of a portion of a turbine nozzle.

The root end face 200 of the non-structural vane 16B contacts or abuts the floor 204 of the root pocket 26. The two surfaces are mutually shaped so as to permit fore-aft pivoting movement (i.e. "pitching") of the non-structural vane 16B relative to the inner band 12. This is accomplished by making the two surfaces non-parallel. In the illustrated example, the root end face 200 is planar, while the floor 204 is convex radially outward, with a point of maximum diameter at the mounting hole 226, creating radial gaps 232 at the forward and aft ends of the root end face 200. Alternatively, the root end face 200 could be curved and the floor 204 could be planar. As seen in FIG. 4, similar shaping of the root end face 200 and floor 204 may be implemented along the tangential axis, so as to permit left-right pivoting movement (i.e. "roll") of the non-structural vane 16B relative to the inner band 12. In this case, relative pivoting movement is permitted about two mutually perpendicular axes.

The outer band 14 incorporates an array of apertures 28 formed therein (see FIG. 2). Each aperture 28 is centered between adjacent structural vanes 16A, and each structural vane 16A carries an outer band segment 30 at its tip end 20. An arcuate cover 32 is provided for each aperture 28. The covers 32 are sized and shaped such that when installed in the apertures 28, they form a continuous annular structure in cooperation with the outer band segments 30. Each cover 32 has array of airfoil-shaped blind tip pockets 34 formed therein. Each tip pocket 34 receives the tip end 24 of one of the non-structural vanes 16B. The tip pockets 34 are sized and shaped such that each permits a small gap between the tip pocket 34 and the associated non-structural vane 16B. Alternatively, a single cover 32 having a single tip pocket 34 could be provided for each non-structural vane 16B.

The turbine nozzle 10 is assembled as follows. First, the fasteners 214 are inserted in the mounting slots 206. The non-structural vanes 16B are inserted from radially outside the outer band 14, through the apertures 28, until their root ends 22 engage the root pockets 26, and the shanks 216 pass through the mounting holes 226. A nominal force is applied to the shanks 216 to seat the fasteners 214 and the retainers (e.g. washers 228) are secured in place. Next, a cover 32 is installed into each aperture 28. The tip ends 24 of the non-structural vanes 16B are then manipulated to enter the tip pockets 34 of the covers 32.

Finally, the covers 32 are secured in the apertures 28. This could be done, for example, using known brazing or welding techniques, or by using mechanical fasteners (not shown). After engine service, the covers 32 may optionally be removed, permitting the non-structural vanes 16B to be replaced as needed, without replacing the entire nozzle 10.

After assembly, the non-structural vanes 16B are retained between the inner band 12 and the outer band 14. The fasteners 214 prevent axial and radial movement of the non-structural vanes 16B, while permitting lateral translation in the tangential direction, and pivoting in all three axes. The non-structural vanes 16B are free to move laterally to a predetermined, limited degree, for example about 0.25 mm (0.010 in.) to about 0.5 mm (0.020 in.). During engine operation, gas pressure on the non-structural vanes 16B loads them against the pockets 26 and 34, preventing further movement in the tangential direction, while permitting the inner and outer bands 12 and 14 to move radially relative to the non-structural vanes 16B.

Figure 5:
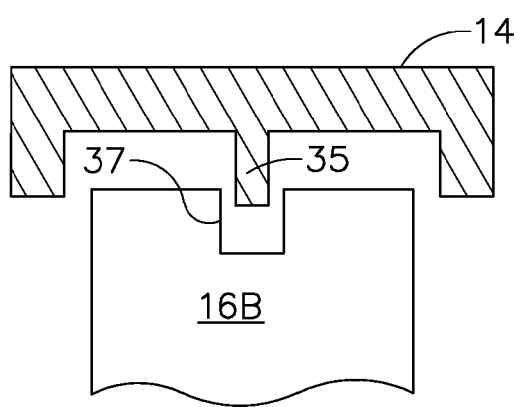
FIG. 5 is a view taken along lines 5-5 of FIG. 4.

It is noted that pins, tabs, holes or other similar features can be added in any combination required to more precisely control the location of the non-structural vanes 16B while still allowing free thermal growth between the structural and non-structural vanes. For example, FIGS. 4 and 5 illustrate a configuration in which a rib 35 formed as part of the tip pocket 34 engages a transverse slot 37 of the tip end 24 of the nonstructural vane 16B, to prevent axial motion of the tip end 24.

The fastener 214, being metallic, has a CTE greater than the non-structural vane 16B as discussed above. As temperatures increase during engine operation, the fastener 214 will elongate radially and increase in diameter. The divergent shape of the proximate portion 220 and the corresponding shape of the mounting slot 206 interact in such a way that the fastener 214 maintains a line contact with the mounting slot 206 at any expected temperature. This type of fastener may be referred to as a "thermally stress-free fastener", implying that thermal expansion or contraction of the fastener 214 does not impart mechanical stresses to the connected components.

It is noted that the configuration of the inner and outer bands may be varied as required to suit a particular application, so long as one of the two bands includes the fastener as described above. In other words, one of the two bands of a turbine nozzle would include apertures and associated covers, the other of the two bands would include blind pockets and fasteners described above.

The turbine nozzle described above has several advantages compared to the prior art. The turbine nozzle described herein has a lower weight as compared to a completely-metallic turbine nozzle, by using a majority of CMC airfoils within a metallic frame. This turbine nozzle can also work to reduce cooling flow, because the majority of airfoils do not require air cooling.

The configuration described above allows the metal frame to dictate the thermal growth response of the nozzle, while the CMC airfoils are free thermally to grow and carry only aerodynamic pressure loading. The CMC airfoils are seated to the inner and outer bands under running conditions by the aerodynamic loading, and the metallic bands and airfoil struts transfer the load to the outer case to allow conventional cantilevered nozzle configuration. The technology described herein maintains very similar thermal response of the nozzle assembly to the rest of the engine, compared to a completely-metallic nozzle. Other features of a cantilevered nozzle (e.g. seals and shields) can be attached to this composite assembly in the same fashion as a full metallic nozzle.

This configuration described above may be used to hold materials of dissimilar thermal expansions together at any temperature to provide a thermally stress-free joint and also allow for three degrees of rotation and one degree of translation in the join between the dissimilar materials. This has utility for providing a deterministic mounting arrangement between standard superalloy materials and low density materials, such as ceramics or Ti—Al, in the hot sections of a jet engine.

While described in the context of a turbine nozzle above, the fastener and component connection configuration described above has additional utility for other applications and may be used for any mechanical connection between two components in which the fastener and one of the components have different CTEs and which requires freedom of pivoting movement between the two components. In that regard, the non-structural vane 16B with end face 200, inner band 12 with floor 204, and fastener 204 are generically representative of the connection of any two components having two abutting surfaces, and connected with a thermally-stress free fastener as described above.

The foregoing has described a turbine nozzle for a gas turbine engine. All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings) may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of the foregoing embodiment(s). The invention extends any novel one, or any novel combination, of the features disclosed in this specification (including any accompanying claims, abstract and drawings), or to any novel one, or any novel combination, of the steps of any method or process so disclosed.

What is claimed is:

1. A turbine component assembly for a gas turbine engine, comprising:
   a first component having a first coefficient of thermal expansion and including an end face;
   a second component including a mating surface abutting the end face; and
   a fastener having a second coefficient of thermal expansion different from the first coefficient of thermal expansion, the fastener including a shank engaging the second component and an enlarged head engaging a mounting slot in the first component;
   wherein the mating surface and the end face shaped to permit relative pivoting movement between the first and second components.

2. The assembly of claim 1 wherein the mating surface has a mounting hole passing therethrough which receives the shank of the fastener.

3. The assembly of claim 1 wherein the mating surface and the end face are shaped to permit relative pivoting movement therebetween, about two mutually perpendicular axes.

4. The assembly of claim 1 wherein the mating surface is convex-outward-curved and the end face is planar.

5. The assembly of claim 1 wherein the shank is connected to a retainer that bears against the second component.

6. The assembly of claim 5 wherein the retainer comprises a washer metallurgically bonded to the shank.

7. The assembly of claim 1 wherein the head of the fastener includes a proximate portion adjacent the shank and a distal portion, the proximate portion having a surface with a diverging shape.

8. The assembly of claim 7 wherein the proximate portion is a body of revolution.

9. The assembly of claim 1 wherein the mounting slot has a cross-sectional shape comprising an entrance, an enlarged end chamber, and a tapered section interconnecting the entrance and the end chamber, the tapered section comprising a pair of spaced-apart walls which diverge from each other.

10. The assembly of claim 1 wherein the fastener comprises a metallic alloy.

11. The assembly of claim 1 wherein the first component comprises a ceramic matrix composite.

12. A turbine nozzle apparatus for a gas turbine engine, comprising:
   an annular inner band;
   an annular outer band circumscribing the inner band;
   a plurality of airfoil-shaped structural vanes extending between and interconnecting the inner band and the outer band; and
   a plurality of airfoil-shaped non-structural vanes extending between the inner band and the outer band, each non-structural vane having a root end received by the inner band and a tip end received by the outer band, wherein one of the tip end and the root end is connected to the respective band by a fastener having a shank engaging the band and an enlarged head engaging a mounting slot in the non-structural vane.

13. The apparatus of claim 12 wherein one of the inner and outer bands includes a plurality of blind pockets, each blind pocket receiving one of the ends of the non-structural vanes, each blind pocket including a floor with a mounting hole passing therethrough which receives the shank of the fastener.

14. The apparatus of claim 13 wherein the floor and an end face of the non-structural vane are shaped to permit relative pivoting movement therebetween.

15. The apparatus of claim 14 wherein the floor and the end face are shaped to permit relative pivoting movement therebetween, about two mutually perpendicular axes.

16. The apparatus of claim 12 herein the floor is convex-outward-curved and the end face is planar.

17. The apparatus of claim 13 wherein the shank is connected to a retainer that bears against the floor of the blind pocket.

18. The apparatus of claim 17 wherein the retainer comprises a washer welded to the shank.

19. The apparatus of claim 12 wherein the head of the fastener includes a proximate portion adjacent the shank and a distal portion, the proximate portion having a surface with a diverging shape.

20. The apparatus of claim 19 wherein the proximate portion is a body of revolution.

21. The apparatus of claim 12 wherein the mounting slot has a cross-sectional shape comprising an entrance, an enlarged end chamber, and a tapered section interconnecting the entrance and the end chamber, the tapered section comprising a pair of spaced-apart walls which diverge from each other.

22. The apparatus of claim 12 wherein the fastener comprises a metallic alloy.

23. The apparatus of claim 12 wherein one of the inner and outer bands includes:
   a plurality of spaced-apart apertures formed therein; and
   a cover received in each aperture, the cover including at least one blind pocket, each blind pocket receiving one of the ends of the non-structural vanes.

24. The apparatus of claim 12 wherein the non-structural vanes comprise a ceramic matrix composite.

25. The apparatus of claim 12 wherein the structural vanes comprise a metallic alloy.

26. The apparatus of claim 12 wherein:
   the inner band includes a plurality of blind pockets, each blind pocket receiving one of the ends of the non-structural vanes, each blind pocket including a floor with a mounting hole passing therethrough which receives the shank of the fastener; and
   the outer band includes:
   a plurality of spaced-apart apertures formed therein; and
   a cover received in each aperture, the aperture including a plurality of blind pockets, each blind pocket receiving one of the tip ends of one of the non-structural vanes.

* * * * *